May 28, 1935.   G. M. DEMING   2,002,883
SEAT LEAK INDICATOR FOR PRESSURE REGULATORS
Filed Sept. 29, 1932
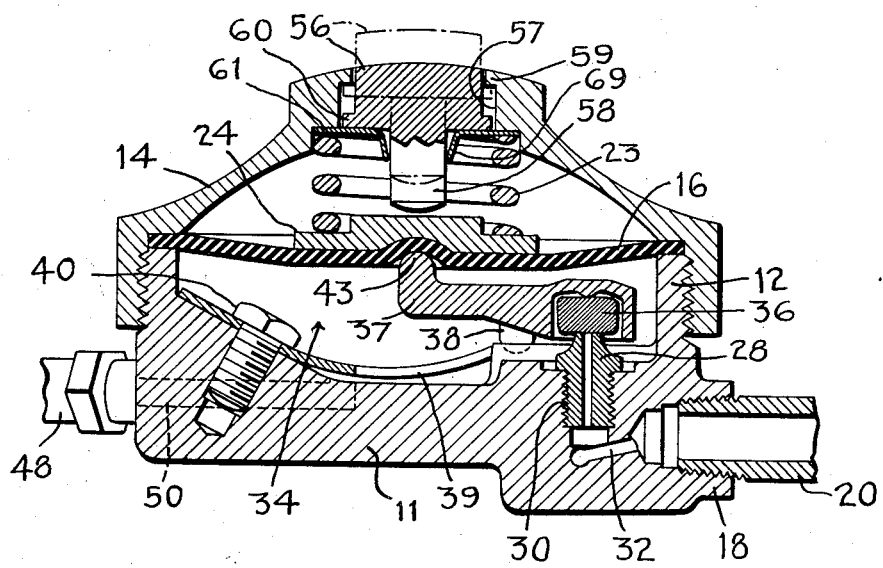
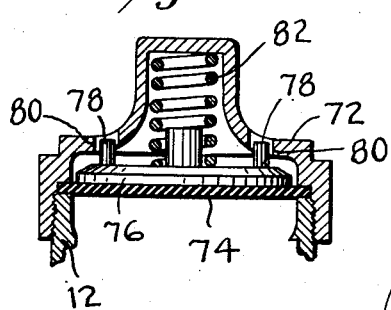
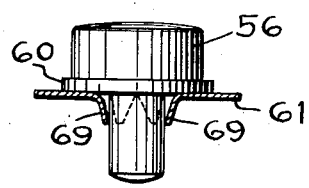
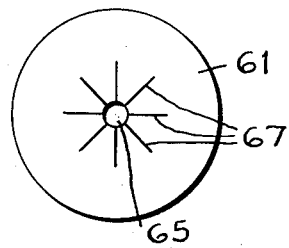
INVENTOR
George M. Deming
BY
ATTORNEY Patented May 28, 1935

2,002,883

UNITED STATES PATENT OFFICE 2,002,883

SEAT LEAK INDICATOR FOR PRESSURE REGULATORS

George M. Deming, East Orange, N. J., assignor to Air Reduction Company, Incorporated, New York, N. Y., a corporation of New York Application September 29, 1932, Serial No. 635,341

16 Claims. (Cl. 116—114)

This invention relates to pressure regulators or reducing valves, and particularly to signal means for indicating valve leakage in such apparatus. This application is a continuation in part of application Serial No. 547,851, filed June 30, 1931 now Patent No. 1,948,027, dated Feb. 20, 1934.

Pressure regulators or reducing valves have a high pressure inlet which connects with a gas cylinder or other source of supply, and a reduced pressure chamber with a valve for controlling the flow of gas into the reduced pressure chamber. The valve is controlled by a diaphragm and one or more springs. The valve is sometimes connected directly with a diaphragm, which, when the pressure in the chamber tends to exceed a certain value, becomes sufficiently flexed to close the valve, against the action of a regulating spring which seeks to open the valve. In many cases the valve is opened and closed by springs, and a diaphragm, exposed to the pressure in the chamber, acts against one of the springs so that the other spring will close the valve when the pressure reaches the desired value.

Gas from the reduced pressure chamber passes directly to a delivery line in a single stage regulator, or passes through a second valve controlled by another diaphragm, in a compound or multistage regulator. As gas flows off through the delivery line, the pressure against the diaphragm tends to diminish, the valve opens, or opens a little farther, and the gas flow from the inlet through the valve sustains the pressure at the desired value. Thus, the gas delivered by the regulator is held at a reduced and uniform pressure.

When the valve in the regulator closes, it is important that the flow of gas into the reduced pressure chamber stop. If the valve leaks, the regulation is poor, and when the delivery line is shut off, the leak is likely to result in such a pressure rise in the chamber that the diaphragm will be ruptured.

A valve leak is serious in compound regulators having a direct first-stage regulator and an indirect second-stage regulator. In event of a valve leak in the first stage of such a regulator, pressure builds up in the interstage chamber and can not be relieved into the low pressure chamber, because the valve element of the second stage closes in the direction in which the pressure acts. If the interstage chamber is not provided with a pressure gauge, a valve seat leak in the first stage will remain unknown until after it has caused damage.

The principal object of this invention is to provide a signal for indicating the existence of a valve leak or "seat leak" in a pressure regulator.

Another object is to provide a simple and efficient signal which is inactive during the regular operation of a pressure regulator, and which moves into display position upon an abnormal pressure rise within the regulator, such as caused by a valve leak.

Another object is to provide a signal which is concealed by a part of the regulator case during the regular operation of the regulator and which moves into view whenever an abnormal pressure rise occurs within the regulator.

Another object is to provide a signal, for indicating the existence of excessive pressure in the regulator, with non-positive means for holding the signal in retracted position. An advantage of this combination is that the signal can be returned to the normal or non-signaling position without opening the regulator, in the event that the pressure rise is caused by an obstruction on the valve seat, which removes itself and thus makes opening of the regulator unnecessary.

A more particular object of the invention is to provide a signal button in an opening through the regulator casing, and to provide a stem on the button which extends into proximity to the regulator diaphragm, or a part associated with the diaphragm, so that it is out of the normal range of movement of the diaphragm but is displaced by an abnormal movement of the diaphragm such as occurs when a worn seat, or obstruction under the valve, permits gas to enter the regulator after the valve should have moved to closed position.

Other objects, features and advantages of the invention will appear or be pointed out as the specification proceeds.

In the accompanying drawing, forming a part hereof:

Fig. 1 is a sectional view of a pressure regulator embodying this invention;

Fig. 2 is a detail view showing the signal button in elevation and its retaining means in section;

Fig. 3 is a plan view of the retaining washer before it is placed on the stem of the signal button; and Fig. 4 is a fragmentary sectional view showing a modified form of the invention.

The regulator case comprises a body 11 having an annular rim 12, and a cap 14 threaded to the body. A diaphragm 16 is clamped between a shoulder on the cap 14 and the end of the rim 12.

A boss 18 on the body is threaded for connection with a high pressure inlet conduit 20.

The cap 14 contains a helical control spring 23, which bears at its opposite ends against the center of the cap 14 and against a back plate 24 of the diaphragm 16. This spring determines the delivery pressure of the regulator and the pressure can be changed if means are provided for adjusting the tension on the spring 23.

A high pressure nozzle 28 is screwed into a socket 30 adjacent one side of the regulator. The socket 30 is connected by a passage 32 with the socket of the inlet connection boss 18.

The lip of the nozzle 28 projects into the chamber 34 enclosed by the body 11 and diaphragm 16. A valve element 36, of the kind known as a seat, coacts with the nozzle 28 to control the flow of gas into the chamber 34. This seat, which is preferably of comparatively hard material, is held in a recess in the short arm of a lever 37 of the first class. This lever is fulcrumed on rounded protuberances 38 which work in recesses in the inside wall of the body 11.

A plate compensating spring 39 of more or less crescent form is secured to the inside wall of the body 11 by a screw 40, and its tips press against ears projecting from the sides of the seat holding portion of the lever, as disclosed in my aforesaid patent. The end of the long arm of the lever has a rounded crest 43 bearing against the diaphragm 16.

The regulator shown in the drawing is of the direct type, and more specifically a lever-type regulator. The compensating spring 39 presses the seat 36 against the nozzle 28 in opposition to the high inlet pressure acting through the orifice of this nozzle. The non-adjustable control spring 23, which corresponds to the regulating spring of an adjustable pressure reducing valve or regulator of this class, acts through the diaphragm against the lever, and, being superior to the compensating spring 39, will cause the seat to separate from the nozzle whenever the pressure in the chamber 34 tends to fall below the value for which the control spring is designed. Whenever, on the contrary, the pressure in the chamber 34 tends to increase, the control spring is overcome and the compensating spring urges the seat toward the nozzle.

A delivery conduit 48 is connected with the body 11 and communicates with the chamber 34 through a conduit 50.

If an obstruction comes between the seat 36 and the nozzle 28, or if the seat wears rough in use, gas will leak into the chamber 34, and if no gas flows out through the delivery conduit the pressure in the regulator will eventually build up to the full pressure of the supply cylinder. Such excessive pressure is likely to damage the diaphragm, and if the regulator with the leaking seat comprises the first stage of a two-stage regulator, or compound pressure regulator such as shown in Patent No. 1,948,027, the building up of excessive pressure in the inter-stage space is particularly serious. When the second stage of the regulator is of the inverse type, the valve element of the second stage closes in the direction in which the pressure acts, and if the excessive pressure rises sufficiently, it holds the valve closed and makes it impossible to relieve the pressure through the second stage of the regulator.

It is desirable that some warning be given when the valve seat leaks, so that precautions can be taken to prevent a continued building up of the pressure, and consequent damage to the regulator. This invention provides a simple signaling device, which is displayed or brought into prominence by the action of the diaphragm 16 when the latter is flexed outward beyond the position which it occupies when the seat 36 is closed against the nozzle. This signaling device is shown applied to a single-stage non-adjustable regulator, but it will be understood that it is equally applicable to multi-stage and/or adjustable pressure regulators.

The form of this signal device or indicator can be varied. It preferably consists of a signal device or button 56 occupying an opening 57 in the center of the cap 14. The top of the button is flush with the outside surface of the cap 14 when the button is in retracted position. The button has an inwardly projecting stem 58 opposed to the back plate 24 of the diaphragm, but not ordinarily displaced by the latter. When the diaphragm is pushed out abnormally, the button is thrust outward.

The sides of the button are ordinarily concealed by the cap 14 but move into view when the button is displaced outwardly. These sides of the button, which may be red or some other prominent color, comprise the signal which is concealed during the normal operation of the regulator, but comes into view upon abnormal movement of the diaphragm. If the button is designed to protrude from the casing at all times, but moves further outward when excessive pressure thrusts the diaphragm beyond its normal range, then the lower portion of the side of the button is painted or otherwise marked to provide the signal. Other forms of visible signals will suggest themselves.

An internal flange 59 on the cap at the outer end of the opening 57, and an external stop flange 60 on the inner end of the button, keep the signal button from coming entirely out of the case.

A washer 61 is held between the spring 23 and the inside of the cap 14, encircling the stem 58, and is provided with a number of rearwardly bent, inclined prongs pressing resiliently against the sides of the stem. The friction of these prongs keeps the signal button reliably in place but permits the button to be pushed outward by the diaphragm. Other forms of non-positive holding means may be provided for this purpose. The signal holding means enables the button to be pushed in again to retracted position if the seat obstruction should clear itself, making it unnecessary to take off the cap to clean or replace the seat.

Fig. 3 shows the washer 61 before the stem is inserted through its opening. The original opening 65 is of smaller diameter than the stem 58. The metal is broken to provide radially extending cracks 67, and when the stem 58 is forced through the washer the material between the cracks is bent inwardly to form the prongs 69, as shown in Fig. 2.

Fig. 4 shows a modified form of the invention. The body 12 of the regulator and all parts below the diaphragm are the same as in Fig. 1.

A cap 72 is connected to the body 12 by screw threads, and a diaphragm 74 is clamped between the cap and body. A plate 76 overlies the diaphragm, and signal pins 78 are carried by the plate 76 and extend upwardly into openings 80 in the cap 72. A spring 82 is compressed between the cap and the plate 76, and corresponds to the spring 23 in Fig. 1.

The plate 76 and the signal pins 78 partake of all movement of the diaphragm, but the signal pins are of such length that they do not project above the top face of the cap 72 during the normal operation of the pressure regulator. Excessive pressure, which causes an abnormal outward movement of the diaphragm, lifts the plate 76 and protrudes the signal pins beyond the outside face of the cap 72. The sides of the pins are colored to attract attention.

The operation of the regulator shown in Fig. 1 is as follows:

High pressure gas from the cylinder, or other source, enters the inlet connection 20 and flows through the nozzle 28, into the chamber 34 until the pressure in the chamber acting against the diaphragm, together with the force of the spring 39, is sufficient to overcome the spring 23, so that the diaphragm moves outwardly and the valve seat moves into contact with the nozzle 28 to stop the flow of gas into the chamber 34. If no gas leaks past the valve seat, the pressure in the chamber 34 will remain constant until gas is drawn off through the delivery conduit 48. As gas flows out through the delivery conduit, the pressure in the regulator drops and the valve again opens in a well understood manner. If there is an obstruction between the valve seat and the nozzle, or if the seat is worn rough, gas will leak past the valve seat and force the diaphragm outwardly beyond the position it occupies when the valve seat contacts with the nozzle. This abnormal movement of the diaphragm displaces the stem 58 and protrudes the button 56 from the casing so that the signal on the sides of the button comes into vision.

If the leakage is caused by an obstruction between the valve seat and nozzle, and this obstruction clears away, the pressure can be relieved through the delivery conduit, the diaphragm will return to its normal working range, and the button 56 can be pushed back into the case. If the leakage is caused by a worn and roughened valve seat, it is necessary to open the regulator and replace the seat.

It will be understood that a signal device of this general character may be applied with equal advantage to multi-stage regulators. Various types of signals may be substituted for that herein described. The invention contemplates any kind of visible signal which is inactive during the normal operation of the regulator but moves into display position if there is an abnormal increase in pressure in the regulator, or a signal which is concealed and moves into vision only when the diaphragm is forced beyond its normal range.

I claim:

1. The combination of a pressure regulator having a diaphragm and a pressure chamber on one side of the diaphragm, a valve element for controlling the supply of gas to the chamber, mechanism, including said diaphragm, responsive to the pressure in the chamber for operating the valve element, a visible signal on the other side of the diaphragm, and inactive during the ordinary operation of the pressure regulator, and means for moving the visible signal into display position when gas pressure in the chamber causes abnormal outward movement of the diaphragm.

2. The combination with a pressure regulator having a pressure chamber, a valve seat, and pressure responsive means cooperating with the valve seat to control the entrance of gas into the pressure chamber, said pressure responsive means including a diaphragm which forms a wall of the pressure chamber, of a seat leak indicator including a visible signal on the side of the diaphragm remote from the pressure chamber.

3. The combination of a pressure regulator having a case in which is a pressure chamber, a valve element for controlling the entrance of gas into said chamber, pressure responsive means for operating the valve element to maintain the pressure in the chamber at a desired level, a visible signal adapted to be thrust outward from an opening in the case when the pressure in said chamber exceeds a certain value, and friction means for keeping the signal in its inward position.

4. The combination of a pressure regulator having a chamber, a valve seat, pressure responsive means cooperating with the valve seat to control the admission of gas into said chamber, said means including a diaphragm, a seat leak indicator comprising a visible signal, and means for causing the signal to be displayed when excessive gas pressure in the chamber causes abnormal outward movement of the diaphragm.

5. In combination with a pressure regulator having a case and an opening in the case; a signal button in the opening with the outside of the button flush with the outside of the case around the opening; a diaphragm in the case; a stem on the signal button extending into position to be displaced by abnormal outward movement of the diaphragm, so that the signal button is thrust outward from the case when excessive pressure causes abnormal movement of the diaphragm.

6. In combination with a pressure regulator having a case in which is an opening, a valve element and pressure responsive means in the case for controlling a reduced gas pressure; a signal button in the opening with the outside of the button flush with the outside of the case around the opening; the signal button having a portion extending inwardly for operation by excessive pressure in the regulator to cause the button to protrude; and means holding the button in its flush position during the ordinary operation of the pressure regulator.

7. The combination of a pressure regulator having a case, a valve element and pressure responsive means in the case for controlling a reduced gas pressure; a signal device in an opening through the case; a diaphragm in the case and independent of the signal device during the ordinary operation of the regulator; and means for transmitting abnormal movement of the diaphragm to the signal device to move it outwardly in said opening.

8. The combination of a pressure regulator having a case and an opening in the case; a signal button occupying said opening and having its outside face flush with the outside of the case around the opening; a diaphragm in the case and independent of the signal button during the ordinary operation of the regulator; and a stem between the diaphragm and the signal button, and connected to one of them, for protruding the signal button from the case when the diaphragm is moved outwardly beyond its ordinary range of movement.

9. The combination of a pressure regulator having a valve seat and pressure responsive means cooperating with the valve seat to control the delivery pressure of the regulator, a case enclosing the valve seat and pressure responsive means, and an opening in the case, said opening being of reduced cross-section near its outer end to form an inwardly extending shoulder; a seat leak indicator including a signal button occupying the opening; a flange near the inner end of the signal button for contact with the shoulder to limit outward movement of the signal button; and means for holding the signal button in retracted position, said holding means being yieldable so that abnormal pressure within the regulator moves the signal button outwardly until the flange contacts with the shoulder.

10. The combination of a pressure regulator having a case and an opening in the case; a signal device occupying said opening; a diaphragm in the case and independent of the signal device during the ordinary operation of the regulator; a stem between the diaphragm and the signal device, and connected to one of them, for transmitting abnormal outward movement of the diaphragm to the signal device to displace the signal device outwardly; and spring means for holding the signal device in retracted position.

11. The combination of a pressure regulator having a case and an opening in the case; a signal button occupying said opening; a diaphragm in the case; a stem connected with the signal button and extending into proximity to the diaphragm, and spaced from the diaphragm during the normal range of movement of the diaphragm, but in position so that upon abnormal movement the diaphragm will contact with the end of the stem and displace the stem and signal button outwardly; and spring means bearing against the stem to frictionally retain the signal button in retracted position.

12. In a pressure regulator, a casing; a regulating valve within the casing; operating mechanism for the valve including a diaphragm and a coil spring compressed between the casing and the central portion of the diaphragm; a signal button occupying an opening in the casing adjacent the end of the spring; a stem connected with the signal button and extending along the axis of the spring coil into proximity to the diaphragm so that abnormal outward movement of the diaphragm will displace the stem and move the signal button outward from the casing; and a washer surrounding the stem, and held against the casing by the spring, said washer having bent prongs pressing against the stem to keep the signal button non-positively in retracted position.

13. The combination with a pressure regulator having a case, a chamber, a valve element for controlling the supply of gas to the chamber, mechanism responsive to the pressure in the chamber for operating the valve element, said mechanism including a diaphragm; of a seat leak indicator including a signal button, means for causing abnormal outward movement of the pressure responsive means to displace the button outward, said button having an inwardly extending portion, and a washer having bent prongs pressing against said portion to keep the button non-positively in its inward position.

14. In a pressure regulator, the combination with a reduced pressure chamber, and mechanism responsive to the pressure in said chamber for controlling the admission of gas to said chamber, said mechanism including a diaphragm forming a flexible wall of said chamber, of a signal on the side of the diaphragm remote from said chamber, and means for causing abnormal movement of said diaphragm to display said signal.

15. A pressure regulator comprising a high pressure inlet, a reduced pressure chamber, a valve for controlling the passage of gas from the high pressure inlet to the reduced pressure chamber, means for operating said valve to control the delivery pressure of the regulator including a diaphragm exposed to the gas pressure of the chamber, and means adapted to be actuated by abnormal movement of said diaphragm to expose a signal.

16. A pressure regulator provided with a diaphragm constituting an element of means for reducing and controlling gas pressure, a signal element and means affected by abnormal movement of said diaphragm to move said signal element into conspicuous view.

GEORGE M. DEMING.